June 12, 1951 C. V. JOHNSON 2,556,189
HAND PROTECTIVE DEVICE
Filed Sept. 24, 1945
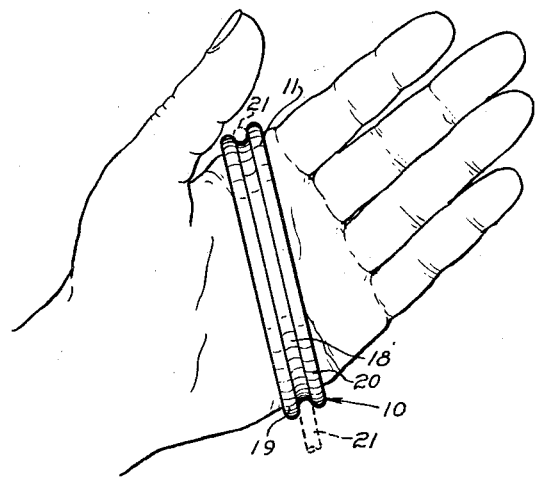
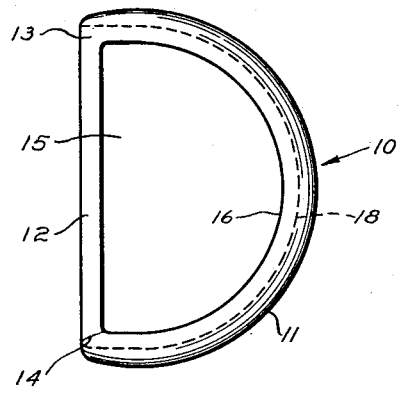
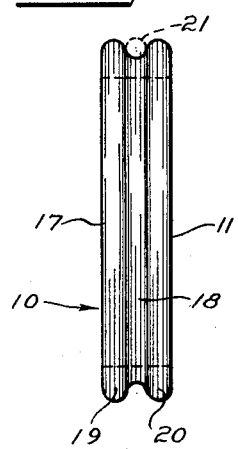
Inventor
Carl V. Johnson
By Strauch & Hoffman
Attorneys Patented June 12, 1951

2,556,189

UNITED STATES PATENT OFFICE 2,556,189

HAND PROTECTIVE DEVICE

Carl V. Johnson, Tampa, Fla.

Application September 24, 1945, Serial No. 618,093

2 Claims. (Cl. 294—25)

The present invention relates to a protective band and more particularly to a device for gripping fishing lines or other hand pulled lines.

In the practice of deep sea fishing, by means of hand lines, it is customary to use the bare hands in pulling the line in and as the line is relatively thin and the fish large and strong, a positive gripping of the line is impossible and severe and uncomfortable cuts and abrasions of the hand result. To date, no suitable gripping and protective device has been offered to protect the fisherman's hands while leaving the fingers free for baiting the hook and removing the fish.

It is, therefore, the primary object of this invention to provide a satisfactory gripping device for hand line fishing and like uses.

Another object of this invention resides in providing suitable hand protective means for deep sea fishermen.

A still further object of this invention resides in providing a line gripping device which covers only a small portion of the user's hand, thereby leaving the fingers free.

Another object is to provide a hand gripping device of simple construction which permits use of the hands in natural manner.

It is a more specific object of the present invention to provide an improved gripping device provided with a line gripping groove having ends of reduced depth to facilitate guiding a line into the groove.

Other objects will appear from the following description when read in connection with the appended claims and attached drawings therein:

Figure 1 is a view looking at the palm of a hand with the device of the present invention applied thereto;

Figure 2 is a side elevational view of the gripping device of Figure 1; and

Figure 3 is a top plan view of the gripping device of Figures 1 and 2.

With continued reference to the drawing wherein like reference numerals indicate the same parts throughout the several figures, numeral 10 designates a gripping device made in accordance with this invention. Gripping devices 10 are preferably worn on both hands of the user, as shown in Figure 1 so that a line may be drawn in in hand-over-hand relation.

Gripping device 10 preferably comprises an arcuate portion 11 and a straight flat portion 12 both of pure rubber or other suitable deformable, water resistant material, such as fibre impregnated rubber or any deformable plastic or other material.

Referring to Figure 2 flat portion 12 and arcuate portion 11 are separate pieces and are vulcanized, or otherwise suitably joined, as at 13 and 14, thereby creating an opening, 15 generally conforming to the cross-sectional shape of the user's hand.

Arcuate portion 11 has a flat internal surface 16 which fits against the user's palm and an external surface 17 which has a grooved central portion 18. Grooved portion 18 is flanked on both sides by reinforcing beaded portions 19 and 20. The beads 19 and 20 are tapered so as to be of reduced height at their opposite ends adjacent the points of connection with the straight portion 12. The groove thus presents tapered ends to guide the line into the central gripping portion of the groove.

The groove and the beaded portions combine to form the gripping means of the device.

In use the device is placed upon the hands of the fisherman by passing the fingers and palm of the hand through opening 15. The grooved external surface of arcuate member 11 is thus disposed outwardly of the palm of the hand of the user and the flat portion 12 passes snugly around the back of the user's hand, thereby holding the gripping device 10 on the hand due to the deformability or elasticity of the material used.

Fishing line 21, shown in dotted lines in Figures 1 and 3, is placed in groove 18 and the line is held lightly in the groove by the fingers until a bite is detected. The user then closes his hand, thereby forcing beaded portions 19 and 20 to firmly engage line 21, and pulls on the line to hook the fish. As any force applied upon groove 18 will cause beaded portions 19 and 20 to converge inwardly, the harder the fish pulls the more firmly the line will become engaged.

The user may then reach out with his other hand and grip the line firmly with the gripper on that hand and pull the line in in hand-over-hand manner. This process is repeated until the fish has been landed or if it is necessary to play the fish by letting out more line this may be readily accomplished by opening the hand and permitting the line to run out, the beads 19 and 20 and a light pressure from the fingers being relied upon to retain the line in position in groove 18.

While the preferred form of the invention has been shown, it is also considered within the scope of the invention to manufacture the arcuate portion of the gripping device from a suitably solid material by making the bottom of groove 18 of a diameter less than the diameter of the fishing line so that the pull on the line will wedge the line on the groove. Groove 18 could also be made V-shaped in cross-section to accomplish the wedging action, if desired.

The device of the present invention not only provides a tight, non-slipping grip on the line but also protects the hands from line burns and cuts. It is also possible to keep the device on the hands at all times, as it covers only a small portion of the user's hands and leaves the fingers free to detect bites, bait hooks, remove fish and innumerable other duties which require unrestricted use of the hands.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A line gripping device adapted to encompass the hand comprising a flexible member having an arcuate grooved portion and a straight portion adapted to extend across the back of the user's hand and connect the ends of said arcuate portion, the groove in the arcuate portion adjacent the points of connection with said straight portion being more shallow than the central portion of the groove whereby the grooved portion when in use and lying against the palm of the hand presents tapered ends operable to guide the line into the groove.

2. A hand line gripping device comprising an arcuate segment of deformable material adapted to extend from one side to the opposite side of the palm of the hand and having an inner flat surface adapted to lie snugly against the palm of the hand and an outwardly facing groove in the opposite surface; beaded sections of reduced height at the opposite ends extending longitudinally of said opposite surface along opposite sides of said groove and providing shallow entrance ways at said opposite ends for directing a hand line into said groove and cooperating with said groove upon closing movement of the hand to substantially enclose said hand line whereby said hand line may be firmly gripped or loosely held so as to permit it to run out without contacting the flesh of the hand; and a relatively thin, non-protruding securing band interconnecting the opposite ends of said arcuate segment and adapted to pass across and snugly engage the back of the hand to thereby retain said gripping device in place on the hand of the user and eliminate structure protruding from the back and sides of the hand and likely to interfere with free use of the hands.

CARL V. JOHNSON.

REFERENCES CITED

The following references are of record in the file of this patent:

UNITED STATES PATENTS

| Number | Name | Date |
| --- | --- | --- |
| 78,546 | Stacy | June 2, 1868 |
| 622,855 | Huefner | Apr. 11, 1899 |
| 1,082,542 | Manson | Dec. 30, 1913 |
| 1,583,606 | Roussel | May 4, 1926 |
| 2,284,029 | Welling | May 26, 1942 |
| 2,301,842 | Abdella | Nov. 10, 1942 |